Figure 1:
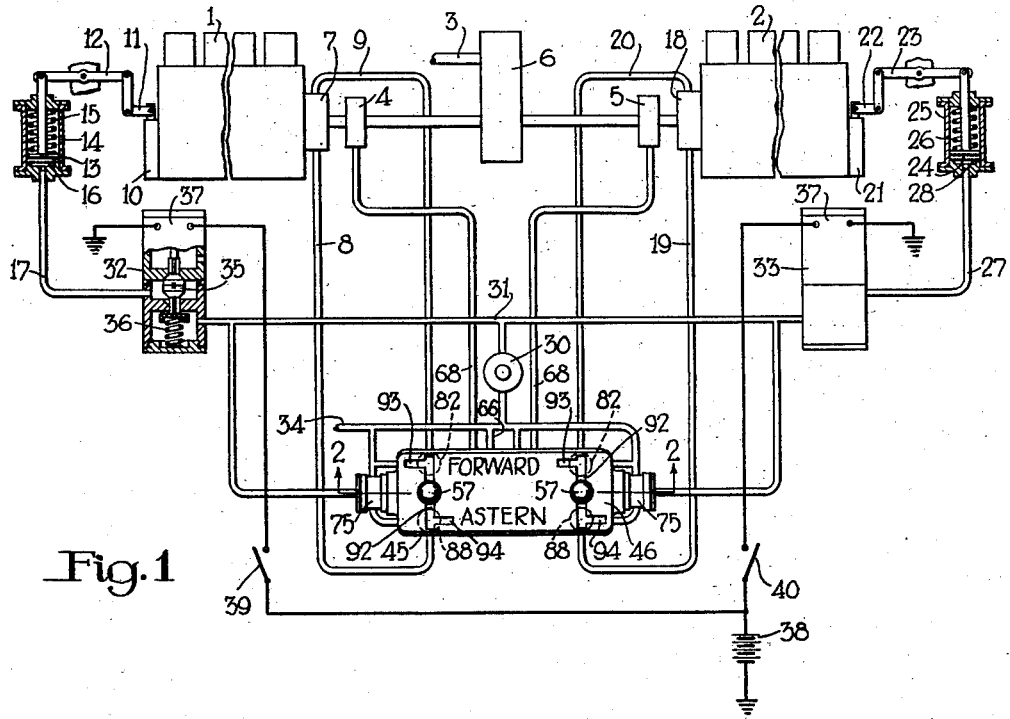

Sept. 17, 1946.  J. N. GOOD  2,407,877

INTERLOCK APPARATUS

Filed July 30, 1942  2 Sheets-Sheet 1

INVENTOR
John N. Good
BY
ATTORNEY

Sept. 17, 1946.    J. N. GOOD    2,407,877

INTERLOCK APPARATUS

Filed July 30, 1942    2 Sheets-Sheet 2

INVENTOR
John N. Good
BY
ATTORNEY

Patented Sept. 17, 1946

2,407,877

UNITED STATES PATENT OFFICE 2,407,877

INTERLOCK APPARATUS

John N. Good, Wilmerding, Pa., assignor to The Westinghouse Air Brake Company, Wilmerding, Pa., a corporation of Pennsylvania Application July 30, 1942, Serial No. 452,950

5 Claims. (Cl. 74—483)

1

This invention relates to interlock apparatus and more particularly to means for preventing undesired operation of control elements.

In certain ships a plurality of Diesel engines, operative either singly or in multiple, are employed for driving a propeller. These engines are of the reversible type for either turning the propeller in one direction to move the ship forward or in the opposite direction for moving the ship in an astern direction. The speed or power output of the engines is varied in accordance with the amount of fuel supplied to the engines and a clutch is employed for connecting and disconnecting each engine to and from the propeller.

When all of the engines are operating to turn the propeller in the same direction, they may all be connected to the propeller, if desired, for propelling the ship in the direction determined by the engines. At times, however, one or more engines operating to turn the propeller in one direction will be connected to the propeller while the other engine or engines will be operating in a direction which if connected to the propeller would cause the propeller to turn in the opposite direction and, as will be apparent, it would be undesirable to connect the latter to the propeller under this condition since it might result in damage to the engines or parts of the transmission system between the engines and propeller.

One object of the invention is therefore the provision of means arranged to prevent engines running in directions which would cause a common means to be operated to turn in opposite directions from being connected at the same time to said means.

Another object of the invention is the provision of means for preventing the engines being connected with the propeller when operating at a speed above a certain low degree, such as idling.

Another object of the invention is the provision of a control system for a plurality of engines arranged to operate a common means, embodying for each engine, a manual controller for controlling the starting of the engine in either one direction or the reverse direction, and for controlling a clutch for connecting and disconnecting the engine to and from said means, and also embodying means for preventing the operation of said clutch to connect said engine to said means when the engine is operating above a chosen low speed or when the means is being operated by another engine operating above said chosen low speed, and further embodying means for preventing operation of said controller to connect its engine running in one direction to

2 said means when said means is connected to another engine operating to turn said means in the reverse direction.

Other objects and advantages will be apparent from the following more detailed description of the invention.

Figure 2:
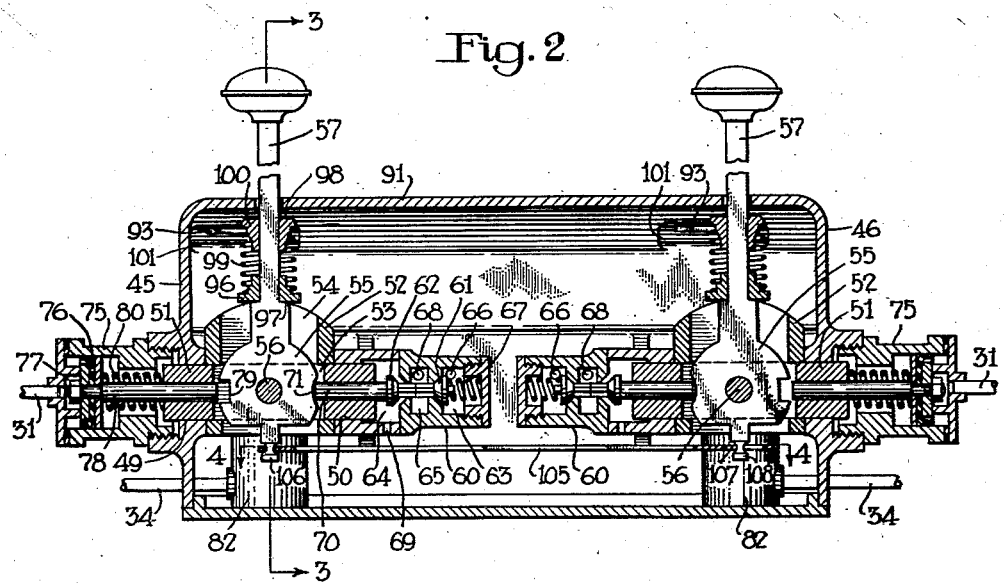
Figure 3:
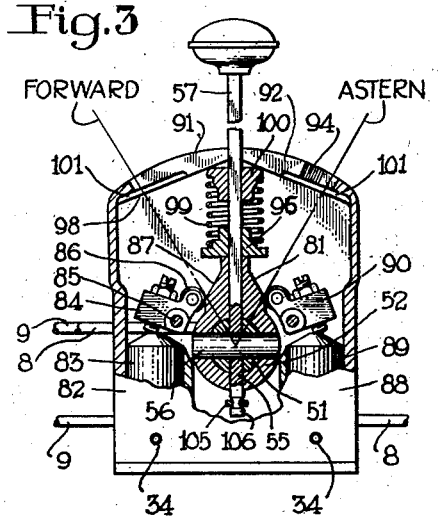
Figure 4:
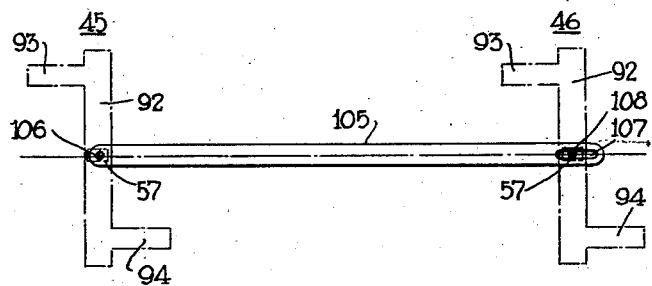
Figure 5:
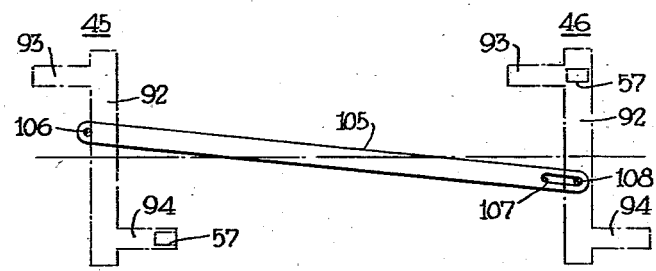
Figure 6:
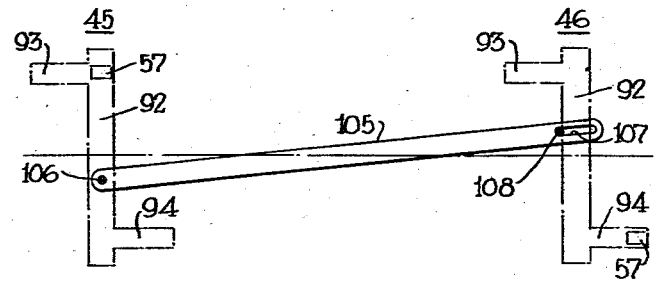

In the accompanying drawings, Fig. 1 is a diagrammatic view of a control system for a plurality of engines embodying the invention; Fig. 2 is a sectional view taken on the line 2—2 in Fig. 1; Fig. 3 is a sectional view taken on the line 3—3 in Fig. 2; Fig. 4 is a sectional view taken on the line 4—4 in Fig. 2; and Figs. 5 and 6 are views similar to Fig. 4 but with certain parts shown in different positions.

Description

In the drawings, the reference numerals 1 and 2 indicate two internal combustion engines which may be of the Diesel type, and both of which are arranged to be connected to operate a common propeller shaft 3 through the medium of suitable clutches 4 and 5, respectively, and a device 6 containing suitable gearing (not shown).

The clutches 4 and 5 may be of any desired type arranged for operation by fluid under pressure supplied thereto to connect the respective engine to the propeller shaft 3 and to disconnect said engine from the propeller shaft upon the release of such fluid under pressure.

Associated with engine 1 is a pneumatic starting control device 7 arranged to be conditioned by fluid under pressure supplied through a pipe 8 to provide for operation of said engine in one direction and through a pipe 9 to provide for operation of said engine in the reverse direction.

A fuel supply device 10 is associated with engine 1 and embodies an adjustable member 11 for varying the fuel supply to and thereby the speed or power output of said engine. For adjusting the member 11 it may be connected to one end of a lever 12 which is fulcrumed intermediate its ends. The opposite end of lever 12 may be connected to a piston 13 contained in a cylinder 14 and subject on one side to the pressure of a calibrated spring 15. At the opposite side of piston 13 is a pressure chamber 16 connected to a pipe 17 through which fluid under pressure may be supplied to and released from said chamber for adjusting the position of piston 13 in cylinder 14 and thereby the position of the fuel governing member 11 in accordance with the pressure of such fluid. With chamber 16 at substantially atmospheric pressure spring 15 will urge the piston 13 to the position shown which may be assumed to be idling position to provide for operation of the engine at a chosen low or idling speed. When the piston 13 is moved in its cylinder by fluid pressure supplied to chamber 16 to a position, for instance, substantially midway of the length of the cylinder 14, it may be assumed that the fuel supply member 11 will be positioned to provide for maximum speed or power output of the engine 1. Intermediate positions of the piston 13, dependent upon the pressure of fluid in chamber 16, will therefore provide corresponding intermediate degrees of speed or power output of engine 1.

Associated with engine 2 is a pneumatic starting control device 18 like the device 7 but controlled by fluid under pressure from pipes 19 and 20. The engine 2 has a fuel governing device 21 embodying a member 22 adjustable by a lever 23 in accordance with the position of a piston 24 in a cylinder 25 as determined by the pressure of a spring 26 acting on one side of the piston and the opposing pressure of fluid supplied through a pipe 27 to a pressure chamber 28 to act on the opposite side of said piston. The piston 24 may have a position such as shown to provide for operation of the engine at idling speed and other positions depending upon the pressure of fluid in chamber 28 to provide corresponding speeds or degrees of power output as described in connection with piston 13 associated with engine 1.

A manually adjustable control device 30 of any suitable type is provided for controlling the pressure of fluid in pressure chambers 16 and 28 and thereby the adjustment of pistons 13 and 24 and the speed or power output of engines 1 and 2, respectively. To accomplish this end the device 30 is connected to a pipe 31 which is arranged to be opened through cutoff valve devices 32 and 33 to pipes 17 and 27 leading to the pressure chambers 16 and 28, respectively. With the pressure chambers 16 and 28 thus connected to the control device 30 said device is operative to either open both of said chambers to the atmosphere to provide for operation of engines 1 and 2 at their idling speeds or to supply fluid at any desired pressure from a fluid pressure supply pipe 34 to both of said chambers to cause operation of said engines at a chosen higher speed or degree of power output.

The cutoff valve device 32 is provided to render the engine 1 non-responsive to an increase in fluid pressure provided in pipe 31 by operation of control valve device 30, if it is desired that the engine 1 be disconnected from the propeller shaft 3 and be operating at idling speed, while the engine 2 is operating said shaft to propel the craft at a speed determined by operation of the control valve device 30. The cutoff valve device 33 is provided to accomplish the same result, with respect to engine 2.

Both of the cutoff valve devices 33 and 32 may be of the same construction, each comprising a double beat valve 35 having one position for opening communication between pipe 31 and the respective pipe 17 or 27 and another position for closing such communication and opening the latter pipe 17 or 27 to atmosphere. A spring 36 in each cutoff valve device is operative to move the double beat valve 35 to the position for connecting pipe 31 to pipe 17 or 27, while an electromagnet 37 is arranged for operation upon energization to move the double beat valve to its other position for closing communication between pipe 31 and pipe 17 or 27 and opening the latter to atmosphere.

The electromagnets 37 of the cutoff valve devices 32 and 33 are arranged to be energized by electric current from any suitable source such as a battery 38. A manually operative switch 39 is provided in the circuit to magnet 37 of the cutoff valve device 32, while a corresponding switch 40 is provided in the circuit to the magnet of the cutoff valve device 33. Closing these switches is arranged to effect energization of the respective electro-magnets while opening the switches is arranged to effect deenergization of said magnets. With the magnets deenergized, it will therefore be seen that the engines 1 and 2 will operate in accordance with operation of the manual control device 30, and that with the magnets energized the engines will be non-responsive to operation of the control device 30 and will operate only at idling speed. These switches and the cutoff valve devices 32 and 33 are therefore effective to cut out either one engine or the other, as desired.

According to the invention I provide a manual control device 45 for controlling the starting control device 7 and the clutch 4 for engine 1. This manual control device also embodies means controlled from pipe 31 for preventing operation of clutch 4 to connect engine 1 to the propeller shaft 3 with either engine operating above a chosen low speed, such as idling. A similar manual control device 46 is provided for controlling the starting control device 18 and clutch 5 for engine 2 and is also provided with means controlled from the speed control pipe 31 for preventing engagement of clutch 5 with either engine operating above a chosen low speed, such as idling. Means are also provided for preventing operation of both of the manually control devices 45 and 46 to connect both engines 1 and 2 to the propeller at the same time when the engines are operating in directions which would cause the propeller to turn in opposite directions.

The control device 45 comprises a casing having two spaced aligned bearings 49 and 50 in which a rock shaft 51 is journaled. A cage 52 interposed between and bearing against the adjacent ends of bearings 49 and 50 has aligned openings through which the shaft 51 extends. Between the bearings 49 and 50 the shaft 51 has a slot 53 extending diametrically therethrough and the cage 52 has an aligned slot 54. An operating member 55 of substantial disk form is disposed in slot 53 and extends into slot 54 and is journaled at its axis on a pin 56. The pin 56 is arranged at right angles to the axis of shaft 51 and is carried in suitable bores in said shaft at opposite sides of slot 53 and in the adjacent portions of cage 52. The thickness of the operating member 55 is less than the width of slots 53 and 54 only sufficiently to provide free rocking movement about the pin 56. The cage 52 being secured to shaft 51 by pin 56 holds the rock shaft 51 against endwise movement.

The operating member 55 is formed on one end of a lever 57 and from the above description it will be seen that the pin 56 provides for rocking of said lever and member on said pin relative to the rock shaft 51 in the direction of the length of said shaft, while said rock shaft provides for movement of said lever and operating member at right angles to the axis of the shaft, the operating member 55 under this latter condition providing an operating connection between said lever and shaft for turning the shaft with the lever.

A starting control valve device 82 is provided in the casing at one side of rock shaft 51 beyond the adjacent end of pin 56. This device comprises a vertically movable plunger 83 (Fig. 3) and valve means (not shown) operable upon downward movement of said plunger to supply fluid under pressure from the supply pipe 34 to the starter control pipe 9 for actuating the starter control device 7 to provide for starting of the engine in one direction. It may be assumed that with the engine 1 operating in this direction the propeller shaft 3 when connected to said engine will cause movement of the ship in a forward direction. Movement of the plunger 83 in an upward direction as viewed in Fig. 3 is arranged to allow release of fluid under pressure from the starter control pipe 9 to provide for stopping of the engine or for starting of the engine in the opposite direction, as will be later described.

For controlling the plunger 83 one end of a lever 84 bears against the plunger. This lever is supported on a pin 85 secured in the casing while the opposite end is provided with a roller 86 arranged to contact a cam surface 87 provided on the cage 52 above one end of pin 56 and adjacent the top of operating member 55. Movement of the member 57 toward the left-hand as seen in Fig. 3 or upward as viewed in Fig. 1, to a position bearing the legend "forward" is arranged to operate cam 87 and thereby the lever 84 to move the plunger 83 in a downward direction for supplying fluid under pressure to the starter control pipe 9, while movement of said lever back to its normal position shown is arranged to provide for movement of the plunger 83 in the reverse direction for releasing fluid under pressure from pipe 9.

At the opposite side of shaft 51 and beyond the opposite end of pin 56 is a starting control valve device 88 which may be identical to the device 82 and which comprises a plunger 89 operable upon downward movement to supply fluid under pressure from the supply pipe 34 to pipe 8 leading to the starter control device 7 to provide for operation of said device to cause starting of the engine 1 in the direction of the reverse of that attained by the supply of fluid under pressure to pipe 9, or in a direction to cause movement of the ship in an astern direction when connected to the propeller shaft 3, as indicated by the legend "astern" in Figs. 1 and 3.

A lever 90 like lever 84 is arranged for controlling movement of plunger 89, and the cage 52 is provided with a cam 81 opposite the cam 87 for operating the lever 90. By this construction movement of the operating lever 57 downward as viewed in Fig. 1 or in the direction of the right-hand, as viewed in Fig. 3, will actuate the valve device 88 to cause starting of the engine in the direction to provide for astern movement of the ship, while return of the lever 57 to the neutral position shown will provide for operation of the valve device 88 to release fluid under pressure from pipe 8 in order to effect stopping or reversal of the engine.

A more detailed description of the structure and operation of the valve devices 82 and 88 is not deemed essential since devices of this type are well known to those skilled in the art.

The top wall 91 of the casing of the control valve device 45 is provided with a relatively long slot 92 extending at right angles to the axis of rock shaft 51. This slot provides for movement of the lever 57 to either "forward" position or "astern" position for actuating the starter control valve devices 82 and 88 respectively for starting the engine 1 in either one direction or in the reverse direction as above described, and to the neutral position for stopping the engine. It will be seen that this slot prevents movement of the lever 57 in any direction except for operating the valve devices 82 or 88.

A clutch control device 60 is associated with the casing bearing 50 beyond the journaled end of shaft 51. This device comprises two oppositely seating poppet valves 61 and 62 arranged in co-axial relation with rock shaft 51 and contained in chambers 63 and 64, respectively. These valves have fluted stems extending toward each other through suitable bores in the device and meeting in a chamber 65. The chamber 63 is connected by a pipe 66 to the fluid pressure supply pipe 34 and contains a spring 67 acting on the valve 61 for seating same and at the same time unseating the valve 62. The chamber 65 is connected by a pipe 68 to the clutch 4 for engine 1. The chamber 64 is open through a passage 69 to the interior of the casing and thus with the atmosphere through openings including slot 92.

The rock shaft 51 between the operating member 55 and valve 62 is provided with an axial bore in which is slidably mounted a plunger 70. One end of this plunger engages the valve 62 while the other end is aligned for engagement by the peripheral surface of the operating member 55 at one side of pin 56. The operating member 55 has in its peripheral surface a recess 71 arranged to receive the adjacent end of plunger 70 when the operating lever 57 is in the vertical position shown in Figs. 1 and 2. With the plunger 70 in recess 71 spring 67 is operative to seat valve 61 and open valve 62 to thereby connect the clutch control pipe 68 to the atmosphere for effecting operation of the clutch 4 to disconnect the engine 1 from the propeller shaft. Movement of the lever 57 from this vertical position in either a clockwise direction or counterclockwise direction, as viewed in Fig. 2, is adapted to turn the operating member 55 to a position in which a portion at either one side or the other of recess 71 is in engagement with the plunger 70 and during such movement effect movement of the plunger 70 outward of shaft 51 to seat valve 62 and unseat valve 61. With the valve 61 thus open fluid under pressure will flow from the supply pipe 34 to pipe 68 and thence to clutch 4 for effecting operation thereof to connect the engine 1 to the propeller shaft 3.

In order that the lever 57 may be operated as just described for controlling the operation of the clutch 4, the top wall 91 of the casing is provided with two oppositely extending slots 93 and 94 opening to the opposite sides of the slot 92 adjacent its opposite ends. It will be seen that since engagement of the clutch 4 is dependent upon movement of the lever 57 in either a clockwise or counterclockwise direction from the position shown in Fig. 2 and thus out of the slot 92, the clutch will be disengaged with the lever in the slot 92 and be engaged only upon movement into the slot 93 or into the slot 94.

In use, let it be assumed that the lever 57 is in its neutral position midway between the ends of slot 92 as shown in Figs. 1 and 3. If it is now desired to start the engine 1 in such a direction as to cause operation of the propeller shaft 3 to move the ship forward the lever 57 is moved in slot 92 to "forward" position for thereby operating the starter control valve device 82 to cause the engine 1 to be started in a direction to obtain forward movement of the ship. After the engine is thus started, the lever 57 is drawn back from the end of slot 92 to a position aligned with slot 93 and then moved into the latter slot for operating the clutch control device 60 to supply fluid under pressure to pipe 68 for actuating the clutch 4 to connect the engine 1 to the propeller shaft 3, whereupon the engine will operate the propeller of the ship to cause movement of same in a forward direction.

On the other hand, if it is desired that the ship move in an astern direction, the lever 57 is moved either from its neutral position, or from "forward" position through its neutral position which causes stopping of the engine, to its "astern" position at the opposite end of slot 92 to thereby actuate the starter control valve device 88 to supply fluid under pressure to pipe 8 for causing the engine 1 to be started in the reverse direction. The lever 57 may be then moved away from the end of slot 92 into alignment with slot 94 and then into the latter slot for actuating the clutch control device 60 to supply fluid under pressure to pipe 68 for operating the clutch 4 to connect the engine to the propeller shaft 3 for causing movement of the ship in an astern direction.

It will be seen that with lever 57 in slot 92 the clutch control pipe 68 will be opened to atmosphere by way of the clutch control device 60 to effect operation of the clutch 4 to disconnect the engine 1 from the propeller shaft 3. Connecting the engine to the propeller shaft is obtained only upon movement of the lever into either slot 93 or slot 94. The slot 92 provides for starting of the engine in either one direction or the reverse direction before actuating the clutch 4 for connecting the engine to the propeller shaft and also ensures disconnecting the engine from the propeller shaft before reversing the engine.

Within the housing a spring seat 96 mounted on lever 57 rests on a shoulder 97 provided on the lever in substantial alignment with the upper end of cage 52. A friction shoe 100 is slidably mounted on lever 57 between the spring seat 96 and inner surface 98 of the top wall of the casing. A coil spring 99 under pressure encircles the lever 57 and is supported at one end on the spring seat 96 and bears at the opposite end against the friction shoe 100 for constantly urging said shoe against the inner surface 98 of the casing.

The inner surface 98 is substantially in the shape of an inverted V in the direction of the length of slot 92 and in said surface adjacent each of the opposite ends of said slot is a recess 101 arranged to receive the shoe 100 upon movement of the lever into alignment with either of the slots 93 or 94. With the shoe 100 engaging the surface 98 at any point between the two recesses 101 the force of the spring 99 against said shoe is operative to automatically return the lever 57 to its neutral position shown in Fig. 3. When the shoe 100 is in either of the recesses 101, the lever 57 is held against movement toward neutral position. By this arrangement it is necessary for the operator to move the lever 57 substantially to either one end or the other of slot 92 in order that the lever will not return to its neutral position shown upon removal of manual force on the lever. This insures adequate movement of the lever to cause starting of the engine in either one direction or the opposite, as desired, and also provides for the lever being held in its clutch engaging positions in slots 93 or 94 due to interlocking of the friction shoe 100 within the recesses 101, and also due to the fact that the surface 98 lengthwise of these recesses is arranged at substantial right angles to the normal or neutral position of lever 57 in slot 92.

A clutch and speed interlock device 75 is secured to the casing over the opposite end of rock shaft 51. This device comprises a piston 76 having at one side a chamber 77 open to the speed or power output control pipe 31. Projecting from the opposite face of piston 76 is a plunger 78 which slidably extends through a suitable axial bore in the adjacent end of shaft 51 into alignment with the peripheral surface of the operating member 55 directly opposite that engaged by the plunger 70. The operating member 55 has a notch or recess 79 provided in its periphery in such a position as to receive the end of plunger 78 when the lever 57 is in slot 92 in which the clutch 4 disconnects the engine 1 from the propeller shaft. A coil spring 80 encircling the plunger 78 bears at one end against the adjacent end of rock shaft 51 and the opposite end bears against piston 76 in opposition to pressure of fluid effective in chamber 77.

As above described, the speed or output of engine 1 is varied according to the pressure of fluid supplied to act in pipe 31, and opening of said pipe to atmosphere provides for idling operation of said engine. The pressure of springs 80 on piston 76 in the interlock device 75 is such as to move said piston and plunger 78 to the position shown when the pressure in pipe 31 and thereby chamber 77 is at a chosen low degree, or substantially that of the atmosphere if desired, and to permit the piston to move the plunger 78 against the operating member 55 when the pressure in said pipe is increased above that degree. Thus if engine 1 should be operating at a speed above the chosen low degree with the lever 57 in slot 92, the plunger 78 will enter recess 79 and prevent turning of member 55 and thus maintain the clutch 4 in the position disengaging engine 1 from the propeller shaft 3. To rock the lever 57 in either direction from the clutch disengaging position shown in Fig. 2 to cause operation of clutch 4 to connect engine 1 to the propeller shaft 3, the pressure in the speed control pipe 31 and piston chamber 77 on the interlock piston 76 must therefore be reduced to a degree which provides for operation of the engine at the chosen reduced speed. When this occurs, spring 80 will move the piston 76 and plunger 78 to the position shown in Fig. 2 in which the plunger 78 is removed from notch 79. When this condition exists, the lever 57 may be moved into either of the slots 93 or 94 for actuating the clutch 4 to connect the engine to the propeller shaft 3. In other words, the interlock valve device 75 controlled from the speed control pipe 31 prevents the operator moving lever 57 into either of the slots 93 or 94 for actuating the clutch 4 to connect the engine 1 to the propeller shaft 3 when the engine is operating at a speed above a chosen low degree.

The manual control device 46 may be identical to the manual control device 45 and like reference numerals have therefore been applied to the main corresponding portions of the control device 46. In Fig. 2 it will be seen that the clutch control device 60, interlock valve device 75, and operating member 55 are disposed in the control device 46 just the reverse of corresponding parts in the control device 45 but this in no way changes the operation of the engine 2 as controlled by the starting control device 18 or of clutch 5 in response to operation of lever 57 in the control device 46 in slots 92, 93 and 94 which are identical to corresponding slots providing for controlling movement of lever 57 in the control device 45. The operator may, therefore, move lever 57 of the control device 46 upward in slot 92 as viewed in Fig. 1, to "forward" position for causing starting of the engine 2 in a direction to propel the ship forward and then into the slot 92 for actuating clutch 5 to connect the engine to the propeller shaft 3, or he may move said lever to the opposite end of slot 92 to "astern" position for causing starting of the engine 2 in a direction for moving the ship in an astern direction and then move said lever into slot 94 for actuating the clutch 5 to connect said engine to the propeller shaft 3, these operations being the same as in the control device 45 and producing the same results with respect to engine 2. Moreover, movement of lever 57 of the control device 46 to actuate clutch 5 to connect engine 2 to the propeller is subject to control by the respective interlock device 75 the same as above described in connection with the control device 45.

If the operator desires to connect both engines 1 and 2 to the propeller shaft 3 at the same time for driving the ship, he may move both levers 57 in the same direction to either one end or the opposite end of slots 92 and then into either slots 93 or 94, respectively, as will be apparent.

However, if one engine is already connected to the propeller shaft at the time it is desired to connect the other engine to said shaft, the interlock device 75 of the controller 45 or 46 controlling the latter engine requires that the pressure in the speed control pipe 31 be such as to provide for idling operation not only of the respective engine, as above described, but also of the other engine and thereby of the propeller shaft 3, since said interlock device is controlled by the same pressure as controls the speed of the other engine. The interlock valve device thus precludes the possibility of connecting either engine to the propeller shaft when said shaft is being driven by the other engine operating at a speed above idling.

If one engine were operating in a direction to cause movement of the craft, say forward, it would be undesirable to be able to connect the other engine operating in the reverse direction with the propeller shaft 3 at the same time, for reasons before pointed out. This however is prevented by a link 105 having one end pivotally connected with a pin 106 depending from the operating member 55 in the control device 45. The opposite end of link 105 has a slot 107 in which is disposed a pin 108 like the pin 106 but depending from the operating member 55 of the control device 46.

In Figs. 4, 5 and 6 the link 107 and the pins 106 and 108 are shown with the two levers 57 and the slots 92, 93 and 94 of the two control devices 45 and 46 superimposed therein in dot and dash form in order to clearly bring out the function of said link and pins.

With the two levers 57 midway between the ends of the respective slots 92 as shown in Fig. 4, it will be seen that the pin 108 associated with the control device 46 is disposed intermediate the ends of slot 107 in the link 105 so that either of the levers 57 may be moved to either one end or the other of the respective slots 92 without interference from the link 105.

Let it be assumed however that in the control device 45 the lever 57 is disposed in slot 94, as shown in Fig. 5, to connect engine 1 to the propeller shaft for causing movement of the ship in an astern direction, as above described. Under this condition, the pin 106 in the control device 45 will occupy a position such as shown in Fig. 5 and its connection with pin 108 will prevent movement of lever 57 in the control device 46 into its slot 93 since the latter pin 108 is in engagement or substantially so with the end of slot 107 in the link. It will, however, be seen that with the lever 57 of the control valve device 45 in slot 94, the lever 57 in control device 46 may be moved to the opposite end of the slot 92 therein for starting the engine in the reverse direction, if such is desired.

If lever 57 in the control device 45 should be disposed in its slot 93 the operator could move the lever 57 in the control device 46 to the opposite end of its slot 92 for starting of the engine 2 under which condition the link 105 will assume an angular position the reverse of that shown in Fig. 5 for preventing movement of lever 57 in the control device 46 into its slot 94. On the other hand, if lever 57 in the control device 46 should be in its slot 94 as seen in Fig. 6, the inner end of slot 107 in link 105 will substantially engage the pin 108 and prevent movement of the lever 57 in the control device 45 into slot 93. In case the lever 57 in the control device 46 should be in slot 93 and the lever 57 of the control device 45 should be moved to the opposite end of its slot 92, the link 105 will assume a position the reverse of that shown in Fig. 6 and prevent movement of the latter lever 57 into its slot 94. The link 105 thus provides for intended operation of the control devices 45 or 46 either singly or jointly but prevents undesired operation thereof.

*Summary*

It will now be seen that I have provided an arrangement whereby a plurality of reversible internal combustion engines operating to cause movement of a driven member in a certain direction may be connected either singly or collectively by individual manual control devices to operate said driven member. These control devices also control the direction which the engines are started and operate and thus the direction which the driven member will move when connected to the engines. A simple mechanical interlock is provided between the control devices to prevent connecting the driven member to an engine which is operating in one direction when the driven member is already connected to another engine operating in the reverse direction. Moreover, the arrangement embodies means for preventing the operation of a clutch to connect an engine to the driven member when that engine or another engine connected to the driven member is operating at a speed above a certain low speed, so as to thereby avoid damage to the clutch, engine, or other parts of the power system.

Having now described my invention, what I claim as new and desire to secure by Letters Patent is:

1. In combination, a casing, two independent lever members each having a first position in which both are arranged side by side, said lever members being movable in opposite directions each to a second position and being then further movable in opposite directions each to a third position, interlock means connecting said lever members providing for independent movement thereof to their first and second position and movement of either to its third position with the other in its first or second position, said interlock means being operative with either of said lever members in its said third position to prevent movement of the other to its third position.

2. In combination, a casing having two slots arranged in parallel relation, two oppositely extending openings one open to each of said slots, two levers one extending through each of said slots, said levers having first positions side by side in said slots, second positions at opposite ends of the respective slots, and third positions in the respective openings, a link having pivotal connections with said levers constructed to provide such variations in the distance between the connections with said levers as to allow movement of both of said levers to their first and second positions at the same time, but to limit the distance between said connections to a degree to prevent movement of either of said levers to its third position with the other in its third position.

3. In combination, a casing, two different control devices in said casing, each control device comprising a rock shaft journaled in said casing, an operating member having a journal connection with said rock shaft at right angles to the axis of said shaft, a first slot in said casing, a lever arranged at right angles to the axis of said rock shaft and extending through said slot and connected to said member, a second slot arranged at right angles to said first slot and open thereto to receive said lever, said lever being operative in said first slot upon movement from a first position adjacent one end to a second position adjacent the opposite end to actuate said member to rock said rock shaft and upon movement from said first slot into said second slot to rock said member relative to said rock shaft, the corresponding slots in both of the control devices extending in opposite directions with the end of the first named slot having said first position in one control device adjacent the like end of the first named slot in the other control device, an interlock link, means connecting the opposite ends of said link to the levers in said control devices, said link providing for free movement of said levers relative to each other in the first named slots and being operative by either of said levers in its second named slot to prevent movement of the other lever into its second named slot.

4. In combination, a casing having two relatively long parallel slots and two relatively short slots arranged at an angle to the long slots with one open to each of said long slots, a lever arranged to move in each of said long slots and into the respective short slots and having different operating positions at the ends of the slots, and a link connecting the two levers providing for independent movement of the levers in the respective long slots and operative to prevent movement of either lever into its short slot with the other lever disposed in its short slot.

5. In combination, a casing having two parallel slots arranged side by side and having other slots arranged at an angle to said parallel slots, one of said other slots being open to each of said parallel slots adjacent each of its opposite ends, two independent control members in said casing, one of said control members being provided for movement in each of said parallel slots and into the connected angular slots, and interlock means connecting said members providing for independent movement of both of said members to opposite ends of the respective parallel slots and into the respective angular slots at like ends of the parallel slots, said interlock means being operable by either of said levers when in the angular slot at either end of the respective parallel slot to prevent movement of the other lever into the angular slot at the opposite end of the respective parallel slot.

JOHN N. GOOD.